United States Patent
Niwa et al.

(10) Patent No.: US 7,262,911 B2
(45) Date of Patent: Aug. 28, 2007

(54) REFLEX-TYPE SCREEN ASSEMBLY

(75) Inventors: Masatoshi Niwa, Niigata (JP); Hajime Maruta, Niigata (JP); Takahiro Koyanagi, Niigata (JP)

(73) Assignee: Arisawa Mfg. Co., Ltd., Nigata (JP)

( * ) Notice: Subject to any disclaimer, the term of this patent is extended or adjusted under 35 U.S.C. 154(b) by 237 days.

(21) Appl. No.: 10/980,339

(22) Filed: Nov. 4, 2004

(65) Prior Publication Data

US 2005/0200952 A1 Sep. 15, 2005

Related U.S. Application Data

(60) Provisional application No. 60/552,720, filed on Mar. 15, 2004.

(51) Int. Cl.
 *G03B 21/60* (2006.01)
 *G03B 21/56* (2006.01)
 *G03B 21/14* (2006.01)

(52) U.S. Cl. .......................... 359/459; 359/461; 353/70

(58) Field of Classification Search ................ 359/459, 359/443, 461; 353/70
See application file for complete search history.

(56) References Cited

U.S. PATENT DOCUMENTS

| 5,096,278 | A | * | 3/1992 | Yoshioka et al. | ........... 359/459 |
| 5,363,237 | A | * | 11/1994 | Wakatake | ................... 359/546 |
| 6,443,579 | B1 | * | 9/2002 | Myers | ........................ 359/613 |

FOREIGN PATENT DOCUMENTS

| EP | 1291709 A1 * | 3/2003 |
| JP | 61109039 A | 5/1986 |
| JP | 02262134 A | 10/1990 |
| JP | 11-44805 A | 2/1999 |
| JP | 11072847 A * | 3/1999 |
| JP | 11-194424 A | 7/1999 |
| JP | 20003427297 A | 12/2000 |
| JP | 2003156799 A | 5/2003 |
| JP | 2004078024 A | 3/2004 |

* cited by examiner

*Primary Examiner*—W. B. Perkey
*Assistant Examiner*—Magda Cruz
(74) *Attorney, Agent, or Firm*—Sughrue Mion, PLLC

(57) ABSTRACT

A reflex-type screen includes a base which has saw-tooth appearance, and an optical absorption layer on one edge of each saw-tooth of the base. The base consists of white resin and includes a plurality of projector side inclined planes and non-projector side inclined planes, which are alternately provided to form the saw-tooth appearance. The projector side inclined planes are oriented so that the image light from the projector may be incident on them, while the non-projector side inclined planes are oriented so that the image light from the projector may not be incident on them. The optical absorption layer is formed on each of the non-projector side inclined planes of the base to absorb the light. The projector side inclined plane reflects the image light just in front of the observer of the reflex-type screen from the projector.

8 Claims, 2 Drawing Sheets

REFLEX-TYPE SCREEN ASSEMBLY

This patent application claims priority from a U.S. Patent Application No. 60/552,720 filed on Mar. 15, 2004, the contents of which are incorporated herein by reference.

BACKGROUND OF THE INVENTION

1. Field of the Invention

The present invention relates to a reflex-type screen for displaying an image which is projected from a projector, and a reflex-type screen assembly equipped with the reflex-type screen.

2. Description of the Related Art

Conventionally, there has been a demand for displaying an image on a screen for an observer located just in front of the screen by projecting the image onto the reflex-type screen at an angle in a short range. When a widely used white mat reflex-type screen is used for the purpose, since majority of the image light projected from the short focal-length projector is reflected to a place where the observer is not present, an even and bright image cannot be provided to the observer located just in front of the reflex-type screen.

For example, as a reflex-type screen that solve the above-mentioned drawbacks, Japanese Patent Laid-Open No. 2000-347297 and Japanese Patent Laid-Open No. 2000-241888 disclose a hologram reflecting screen using hologram element on a reflection plane, which diffuses and diffracts the projected image light towards the observer. In addition, Japanese Patent Laid-Open No. H11-44805 discloses a transparent resin panel on which a shading film is formed, where the cross section of the panel has saw-tooth appearance formed by vertical planes and inclined planes which are provided alternately, as a technique to reduce the reflection of a light on a transparent cover provided, for example, in front of instruments of an automobile.

However, the hologram element of the hologram reflex-type screen has a limit of chromatic dispersion. Therefore, when the image light (e.g., image light projected from a projector) including a predetermined wavelength range is projected, a color shift may occur, for example, in periphery of the screen due to the chromatic dispersion of the hologram element.

Moreover, the hologram element records hologram information by exposing photosensitive resin, or so-called exposing method. When the exposing method is to be employed, it is difficult to enlarge the size of the screen due to the restrictions on a manufacturing method. Moreover, in order to make angle-of-visibility property in a vertical direction being different from that in a horizontal direction, multiple exposure is needed which makes the manufacturing method more complicated.

Moreover, when the transparent resin panel disclosed in Japanese Patent Laid-Open No. 11-44805 is to be employed to the reflex-type screen, there is a problem that it is difficult to give the reflectivity and diffusivity required for the reflex-type screen on a saw-tooth cross section.

SUMMARY OF THE INVENTION

Therefore, it is an object of the present invention to solve the foregoing problem. That is, it is an object of the present invention to provide a reflex-type screen having high contrast, good angle-of-visibility, and even luminance distribution, facilitating the manufacturing of the reflex-type screen of large size. The above and other objects can be achieved by combinations described in the independent claims. The dependent claims define further advantageous and exemplary combinations of the present invention.

In order to achieve the object, according to a first aspect of the present invention, there is provided a reflex-type screen for reflecting an image light projected from a projector at an angle with respect to an observer to a direction substantially perpendicular to the reflex-type screen, i.e., just in front of the observer. The reflex-type screen includes: a base consisting of white resin and including projector side inclined planes oriented so that the image light from the projector is incident on the projector side inclined planes, and non-projector side inclined planes oriented so that the image light from the projector is not incident on the non-projector side inclined planes, wherein the projector side inclined planes and the non-projector side inclined planes are alternately provided to form a saw-tooth appearance; and an optical absorption layer absorbing light, the optical absorption layer being formed on each of the non-projector side inclined planes of the base, wherein the projector side inclined planes reflect the image light from the projector in a direction substantially perpendicular to the reflex-type screen.

According to the above-mentioned configuration, the image light of which the incident angle with respect to the screen is small, can be reflected in a direction substantially perpendicular to the reflex-type screen, i.e., just in front of the observer, and outdoor light, such as room lighting, is effectively absorbable. Therefore, the observer can observe a high contrast image.

Inclination angles of the alternately provided projector side inclined planes may become gradually wider along a direction from a side near the projector toward a side far from the projector to reflect the image light to a direction substantially perpendicular to the reflex-type screen, the incident angles being different from each other depending on distances from the projector. Thereby, the luminance distribution on the screen becomes even and the size of the screen can be easily enlarged.

The projector side inclined planes may be mat finished to diffuse the incident image light when reflecting the incident image. Thereby, the angle of visibility of the image light reflected by the projection side inclined planes is widened.

The non-projector side inclined planes and the projector side inclined planes are provided alternately forming a saw-tooth shape, and the image light from the projector is not incident on the non-projector side inclined planes. An optical absorption layer for absorbing light is generated on the non-projector side inclined planes, and the optical-absorption layer absorbs outdoor light, such as indoor lighting. Thereby, the contrast of the image reflected on the projection side inclined plane improves. It is preferable that the optical absorption layer is a black layer. Therefore, outdoor daylight may be absorbed much efficiently.

According to a second aspect of the present invention, there is provided a reflex-type screen assembly including a reflex-type screen and a projector operable to project an image light at an angle with respect to an observer. The screen includes: a base consisting of white resin and including projector side inclined planes oriented so that the image light from the projector is incident on the projector side inclined planes, and non-projector side inclined planes oriented so that the image light from the projector is not incident on the non-projector side inclined planes, wherein the projector side inclined planes and the non-projector side inclined planes are alternately provided to form a saw-tooth appearance; and an optical absorption layer absorbing light, the optical absorption layer being formed on each of the non-projector side inclined planes of the base, wherein the projector side inclined planes reflect the image light from the projector in a direction substantially perpendicular to the reflex-type screen. Thereby, a reflex-type screen assembly having the same effect as the first aspect can be provided.

The summary of the invention does not necessarily describe all necessary features of the present invention. The present invention may also be a sub-combination of the features described above.

DETAILED DESCRIPTION OF THE INVENTION

The invention will now be described based on the embodiments hereinafter, which do not intend to limit the scope of the present invention as defined in the appended claims. All of the features and the combinations thereof described in the embodiments are not necessarily essential to the invention.

Figure 1:
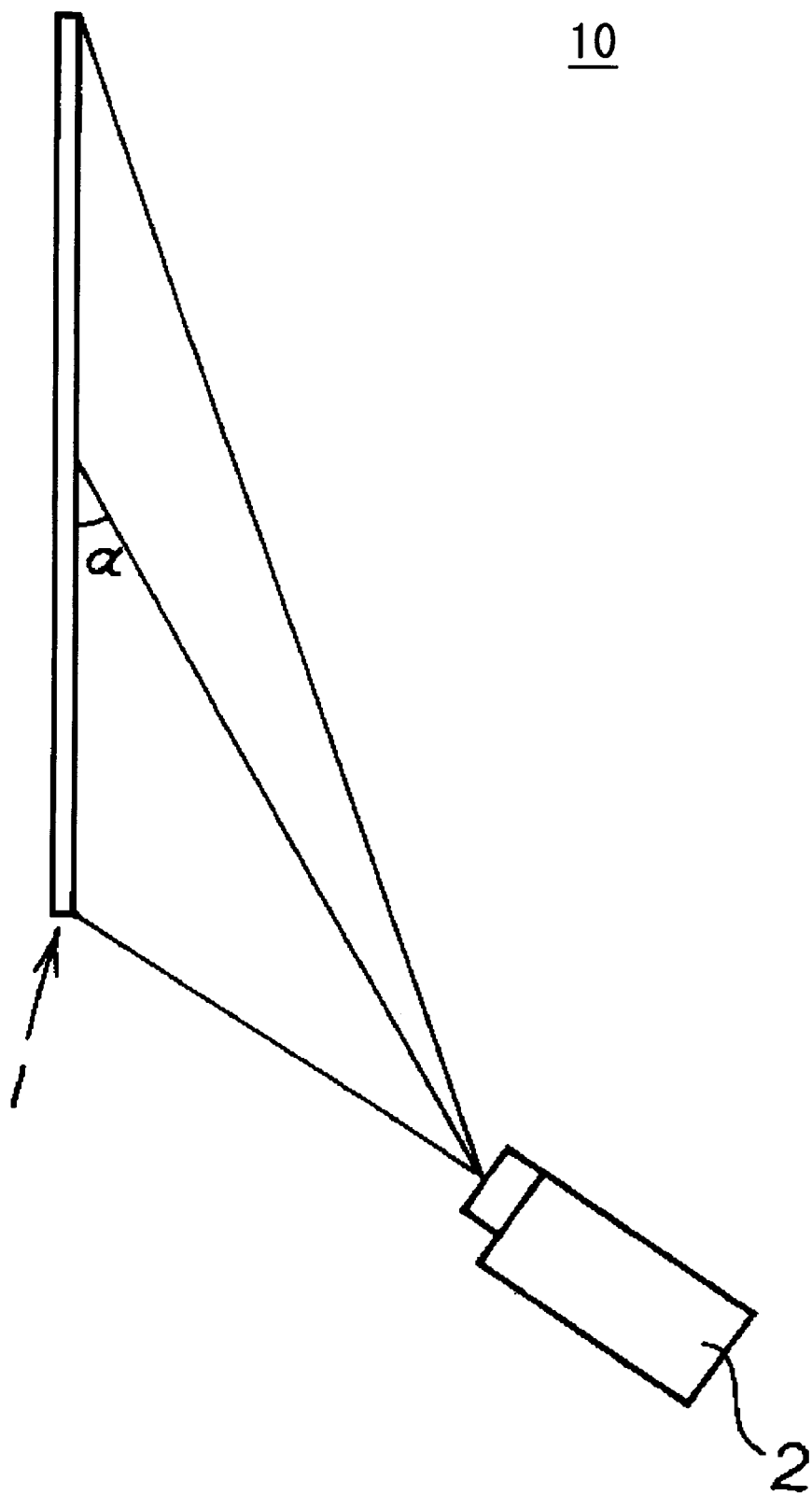
FIG. 1 shows an exemplary configuration of a reflex-type screen assembly according to an embodiment of the present invention.

FIG. 1 shows an exemplary configuration of a reflex-type screen assembly 10 according to an embodiment of the present invention. The reflex-type screen assembly 10 includes a reflex-type screen 1 and a projector 2. For example, the projector 2 is a short focal-length projector. The projector 2 projects image light at an angle from the side of the observer of the reflex-type screen 1. For example, the image light is projected from a front lower part to the reflex-type screen 1. The projector 2 is provided about 0.3–0.7 meter from the reflex-type screen 1. The reflex-type screen 1 reflects the image light projected from the projector 2 towards the observer located right in front of the reflex-type screen 1. A term "reflection" used herein includes "specular reflection" and also "diffuse reflection".

Figure 2:
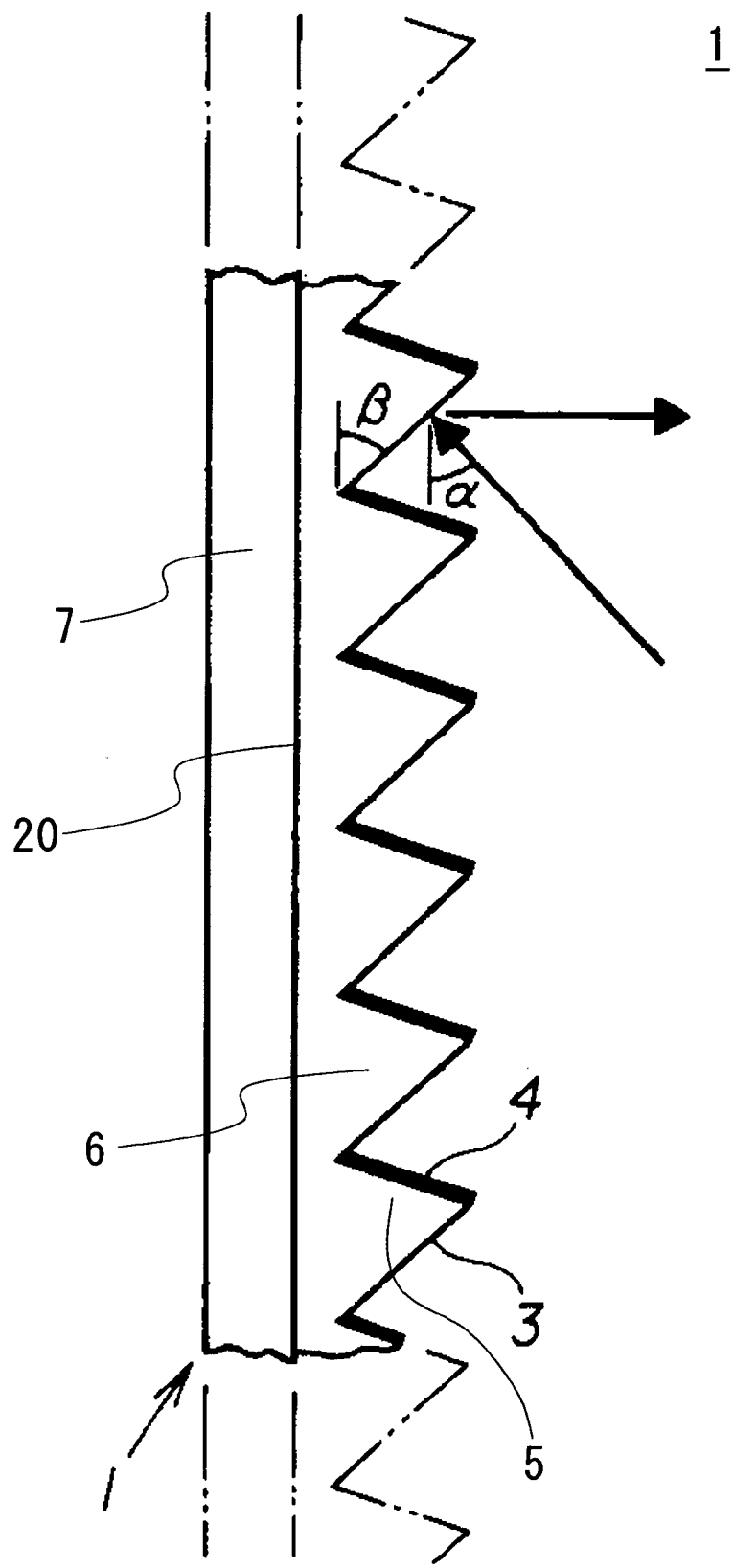
FIG. 2 is a cross-sectional diagram of a reflex-type screen.

FIG. 2 is a cross sectional diagram of the reflex-type screen 1 in one embodiment. The reflex-type screen 1 includes abase 6 which has saw-tooth appearance, and an optical absorption layer 4 on one edge of each saw-tooth of the base 6. The base 6 consists of white resin and includes a plurality of projector side inclined planes 3 and non-projector side inclined planes 5, which are alternately provided to form the saw-tooth appearance. The projector side inclined planes 3 are oriented so that the image light from the projector 2 may be incident on them, while the non-projector side inclined planes 5 are oriented so that the image light from the projector 2 may not be incident on them. The optical absorption layer 4 is formed on each of the non-projector side inclined planes 5 of the base 6 to absorb light. The projector side inclined plane 3 reflects the image light from the project or 2 to a direction substantially perpendicular to the reflex-type screen 1, i.e., just in front of the observer of the reflex-type screen 1.

According to the configuration described above, obstructive light, such as daylight, can be efficiently absorbed while the image light having small incident angle α on the screen can be reflected to a direction substantially perpendicular to the screen surface, i.e., just in front of the observer. Therefore, the observer can observe high contrast image.

Since the reflex-type screen 1 is enough flexible to be rolled to a cylinder, it can be easily stored and carried.

The projector side inclined planes 3 reflect light. The projector side inclined planes 3 reflects the image light from the projector 2 to a direction substantially perpendicular to the screen surface, i.e., just in front of the observer. The projector side inclined planes 3 are mat finished, e.g., roughened for diffusing the image light when reflecting it. Thereby, the projector side inclined planes 3 widen the angle of visibility of the image light. Another example of the mat finishing is optical diffusive resin coating. The coating is done by spraying, coating, dipping, or the like.

On the other hand, the optical absorption layer 4 absorbs light from outside, such as lighting in the room. By this, the contrast of the image light reflected by the projector side inclined planes 3 improves. For example, the optical absorption layer 4 is a black layer. Therefore, outdoor daylight is absorbed very efficiently.

The projector side inclined planes 3 and the non-projector side inclined planes 5 of the reflex-type screen 1 are arranged perpendicularly and alternately. In particular, as illustrated in FIG. 2, each of the projector side inclined planes 3 is formed on lower side of a saw tooth in FIG. 2, and each of the non-projector side inclined planes 5 is formed on upper side of a saw tooth in FIG. 2. Therefore, the present embodiment relates to an aspect that the projector 2 is provided in lower front of the reflex-type screen 1 to observe the image light just in front of the reflex-type screen 1.

However, the position of the projector 2 is not limited to the lower front of the reflex-type screen 1. For example, when the projector 2 is located in upper front of the reflex-type screen 1, the projector side inclined planes 3 are formed in the upper side in FIG. 2 and the non-projector side inclined planes 5 are formed in the lower side. Alternatively, when the projector 2 is located in left front or right front of the reflex-type screen 1, the projector side inclined planes 3 are oriented toward the projector 2 located in the left front or the right front, and the non-projector side inclined planes 5 are oriented to a direction where the light from the projector 2 is not reflected to the non-projector side inclined planes 5. In this case, the projector side inclined planes 3 and the non-projector side inclined planes 5 are alternately provided along horizontal direction. Alternatively, the projector side inclined planes 3 and the non-projector side inclined planes 5 are alternately provided along oblique direction, or a circular projection having saw-toothed appearance formed of reflective plane on planes 3 and optical absorption planes 4 may be located on concentric circle from the projector 2.

Moreover, the projector side inclined planes 3 and the non-projector side inclined planes 5 are formed on the front surface of the reflex-type screen 1, where the saw-tooth appearance of the base 6 is visible. Although a thin film and/or protection material may be provided on the front face of the reflex-type screen 1, it is preferable that the saw-tooth appearance of the base 6 can be seen on the surface of the reflex-type screen 1 also in this case. The image light from the projector 2 is reflected to the observer more certainty than in a case where a resin layer thicker than the height of the saw-tooth appearance is provided on the surface of the reflex-type screen to flatten the surface of the reflex-type screen 1. When laminating another transparent resin on the surface of the reflex-type screen 1, since the index of refraction of the transparent resin and the like have to be taken into the consideration, the design of the projector side inclined plane 3 becomes more difficult. However, according to the present embodiment, the above-described problem does not occur, which simplifies the design of the projector side inclined plane 3.

It is preferable that the inclination angles of the alternately provided projector side inclined planes 3 become gradually wider along a direction from a side near the projector 2 toward a side far from the projector 2 to uniformly reflect the image light just in front of the reflex-type screen 2, of which the incident angles are different from each other depending on the distances from the projector.

The saw-tooth appearance of the projector side inclined planes 3 and the non-projector side inclined planes 5 will be described further in detail hereinafter. An inclination angle β of one of the projector side inclined planes 3 with respect to a reference plane 20 can be defined by an inclination angle β of the image light, where α+2β=90 [deg]. Moreover, the inclination angle α can be defined by a distance L between the projector 2 and the reflex-type screen 1, and by a vertical location where the light image enters the reflex-type screen 1 (the "vertical location" will be referred to as "height" hereinafter).

The inclination angle of the projector side, i.e., the inclination angle β, changes with the change of the inclination angle α satisfying the above equation. For example, while the inclination angle α decreases gradually from the bottom to the top of the reflex-type screen 1, the inclination angle β increases gradually satisfying the above equation. Thereby, the image light incident on the whole reflex-type screen 1 can be reflected evenly to the observer side.

In this example, the projector 2 is a short focal-length projector, wherein the inclination angle β of one of the saw teeth (prism inclination angle β) is 40 degrees, pitch between two saw teeth is 300 μm, screen size is 60-inch (914 mm×1219 mm), and the distance L is 700.89 mm.

In addition, the inclination angle β of the reflex-type screen may be constant regardless of the location of each saw tooth. For example, the inclination angle β of the whole reflex-type screen 1 is set at a predetermined angle to reflect the image light, which is incident on the center of the reflex-type screen 1, to the direction substantially perpendicular to the reflective surface 1, i.e., just in front of the observer. In this case, although a part of the image light, which is incident on periphery of the reflex-type screen 1, reflects outside of the reflex-type screen 1, the obtainable image is enough bright compared with prior arts.

The inclination angle β is set according to the contrast and screen brightness required for the reflex-type screen 1. When the inclination angle β increases, the area of the optical absorption layer 4 will increase and the area of the projector side inclined planes 3 will decrease. Consequently, the contrast of the reflex-type screen 1 increases and the screen brightness decreases.

On the contrary, when the inclination angle β decreases, the area of the optical absorption layer 4 will decrease and the area of the projector side inclined plane 3 will increase. Consequently, the contrast of the whole screen decreases and the brightness of the whole screen increases. It is preferable that the inclination angle β is set to 10 to 60 degrees.

The base 6 consists of a thermoplastic resin, preferably elastic thermoplastic elastomer. Alternatively, urethane type resin, polyolefin type resin, vinyl-chloride type resin, etc. may be used for the base 6.

The base 6 may further include high brightness filler having a high reflection factor. Specifically, the high brightness filler which consists of silica, titaniumoxide, mica, barium sulfate, barium chloride, aluminum, etc. may also be included. Thereby, the reflection factor of the projector side inclined planes 3 increases, and the brightness of the image improves. In addition, a hardening agent, an anti static agent, an anti stain agent, an ultraviolet absorber, etc. may be added to the base 6 as addition agents.

The base 6 according to the present embodiment will be made in the following procedures. First, white urethane type thermoplastic elastomer is prepared. Then, the urethane type thermoplastic elastomer is coated on a surface of a supporting material 7, which consists of polyethylene terephthalate (PET) etc., by die coater or the like. Next, the resin composition on the supporting material 7 is formed in the shape having saw-tooth cross section by heat transfer molding using a prism roll mold.

It is preferable that the supporting material 7 is made of flexible material such as film. For example, the supporting material 7 is PET (polyethylene terephthalate), PEN (polyethylenenaphthalate), PC (polycarbonate), or the like.

The optical absorption layer 4 includes filler and binder resin which absorb light. The filler in the optical absorption layer 4 is a carbon black pigment, black coloring-matter, etc., for absorbing natural light or white light. The optical absorption layer 4 is formed by coating the resin composition, which is a mixture of the filler, the urethane thermoplastic resin as the binder resin, and diluent for dissolving the urethane thermoplastic resin (e.g., general-purpose organic solvents, such as butylcellosolve, methyl ethyl ketone, and toluene), on the non-projector side inclined planes 5 of the base 6 by a reverse coater, and by being dried by heating to 100 degrees for 2 minutes.

In addition, the optical absorption layer 4 may further include a hardening agent, an anti static agent, an anti stain agent, an ultraviolet absorption agent, etc. in addition to the filler and the binder resin. Moreover, the coating on the optical absorption layer 4 may be done by a comma coater, a gravure coater, a wire bar coater, etc. instead of the reverse coater. In addition, the surface of the optical absorption layer 4 may be mat finished or frosted. By this, since the specular reflection of the outdoor light being incident on the optical absorption layer 4 is reduced by diffusion, the contrast of the picture further improves.

In addition, when the above-mentioned high brightness filler is added to the base 6, the projector side inclined planes 3 will be white or pearl tinged. In another embodiment, aluminum deposition or attachment of aluminum foil may give metallic luster to the projector side inclined planes 3.

As is apparent from the foregoing explanation, the reflex-type screen 1 according to the present embodiment can display the image projected from the projector 2 in high contrast and a good angle-of-visibility. Moreover, the luminance distribution on the screen becomes even and the size of the screen can be easily enlarged.

Although the present invention has been described by way of exemplary embodiment, the scope of the present invention is not limited to the foregoing embodiment. Various modifications in the foregoing embodiment may be made when the present invention defined in the appended claims is enforced. It is obvious from the definition of the appended claims that embodiments with such modifications also belong to the scope of the present invention.

What is claimed is:

1. A reflex-type screen for reflecting an image light projected from a projector at an angle with respect to an observer to a direction substantially perpendicular to the reflex-type screen, comprising:

a base comprising white resin and including projector side inclined planes oriented so that the image light from the projector is incident on said projector side inclined planes, and non-projector side inclined planes oriented so that the image light from the projector is not incident on said non-projector side inclined planes, wherein said projector side inclined planes and said non-projector side inclined planes are alternately provided to form a saw-tooth appearance wherein said projector side inclined planes reflect the image light from the projector in a direction substantially perpendicular to the reflex-type screen, and wherein inclination angles of said projector side inclined planes, which are alternately provided, become gradually wider along a direction from a side near the projector toward a side far from the projector to reflect the image light to a direction substantially perpendicular to the reflex-type screen, the incident angles being different from each other depending on distances from the projector.

2. The reflex-type screen as claimed in claim 1, wherein said projector side inclined planes are mat finished to diffuse the incident image light when reflecting the incident image.

3. The reflex-type screen as claimed in claim 1, further comprising an optical absorption layer absorbing light, said optical absorption layer being formed on each of said non-projector side inclined planes of said base.

4. The reflex-type screen as claimed in claim 3, wherein said optical absorption layer is a black layer.

5. A reflex-type screen assembly comprising a reflex-type screen and a projector operable to project an image light at an angle with respect to an observer, wherein the screen comprises:

a base comprising white resin and including projector side inclined planes oriented so that the image light from the projector is incident on said projector side inclined planes, and non-projector side inclined planes oriented so that the image light from the projector is not incident on said non-projector side inclined planes, wherein said projector side inclined planes and said non-projector side inclined planes are alternately provided to form a saw-tooth appearances;

wherein said projector side inclined planes reflect the image light from the projector in a direction substantially perpendicular to the reflex-type screen, and wherein inclination angles of said projector side inclined planes, which are alternately provided, become gradually wider along a direction from a side near the projector toward a side far from the projector to reflect the image light to a direction substantially perpendicular to the reflex-type screen, the incident angles being different from each other depending on distances from the protector.

6. The reflex-type screen assembly as claimed in claim 5, further comprising an optical absorption layer absorbing light, said optical absorption layer being formed on each of said non-projector side inclined planes of said base.

7. The reflex-type screen assembly as claimed in claim 6, wherein said optical absorption layer is a black layer.

8. The reflex-type screen assembly as claimed in claim 5, wherein said projector side inclined planes are mat finished to diffuse the incident image light when reflecting the incident image.

* * * * *